(12) United States Patent
Chung et al.

(10) Patent No.: US 8,835,026 B2
(45) Date of Patent: Sep. 16, 2014

(54) RECOVERY AND SYNTHESIS METHOD FOR METALOXIDIC CATHODIC ACTIVE MATERIAL FOR LITHIUM ION SECONDARY BATTERY

(75) Inventors: Kyung Yoon Chung, Seoul (KR); Hwa Young Lee, Seoul (KR); Byung-Won Cho, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 661 days.

(21) Appl. No.: 13/015,421

(22) Filed: Jan. 27, 2011

(65) Prior Publication Data

US 2012/0068107 A1    Mar. 22, 2012

(30) Foreign Application Priority Data

Sep. 20, 2010 (KR) .................... 10-2010-0092676

(51) Int. Cl.
| | | |
|---|---|---|
| *H01M 10/54* | (2006.01) | |
| *H01M 6/52* | (2006.01) | |
| *H01M 4/505* | (2010.01) | |
| *H01M 4/04* | (2006.01) | |
| *H01M 4/525* | (2010.01) | |
| *C01G 53/00* | (2006.01) | |

(52) U.S. Cl.
CPC .............. *H01M 10/54* (2013.01); *H01M 4/505* (2013.01); *Y02E 60/122* (2013.01); *H01M 4/0471* (2013.01); *C01P 2006/40* (2013.01); *H01M 4/525* (2013.01); *H01M 4/049* (2013.01); *C01G 53/42* (2013.01)
USPC .......... 429/49; 423/179.5; 423/184; 423/202; 252/182.1

(58) Field of Classification Search
USPC ........ 252/182.1; 423/62, 66, 179.5, 184, 202; 429/179.5, 49
See application file for complete search history.

(56) References Cited

U.S. PATENT DOCUMENTS

2004/0028585 A1 * 2/2004 Cardarelli et al. .............. 423/66

FOREIGN PATENT DOCUMENTS

| JP | 11-293357 | 10/1999 |
|---|---|---|
| JP | 2005-194106 | 7/2005 |
| JP | 2007-012629 | 1/2007 |
| KR | 100975317 | 8/2010 |

OTHER PUBLICATIONS

Notice of Allowance issued in Korea Patent Application No. KR10-2010-0092676, mailed Sep. 26, 2012.

* cited by examiner

*Primary Examiner* — Mark Kopec
*Assistant Examiner* — Haidung Nguyen
(74) *Attorney, Agent, or Firm* — Morrison & Foerster LLP

(57) ABSTRACT

Disclosed are a recovery for a metaloxidic cathodic active material for a lithium ion secondary battery and a synthesis thereof by the recovery method, wherein the recovery method includes (a) dissolving a cathodic active material from a waste lithium ion secondary battery using sulfuric acid solution containing sulfurous acid gas to generate a solution containing metal ions, (b) injecting sodium hydroxide solution and ammonia solution in the solution containing the metal ions to fabricate an electrode active material precursor, and (c) filtrating the active material precursor, followed by drying and grinding, thus to fabricate a solid-state cathodic active material precursor, and the synthesis method is achieved by mixing the electrode active material precursor fabricated according to the recovery method with lithium carbonate or lithium hydroxide, followed by heat treatment, to generate a metaloxidic cathodic active material.

3 Claims, 3 Drawing Sheets

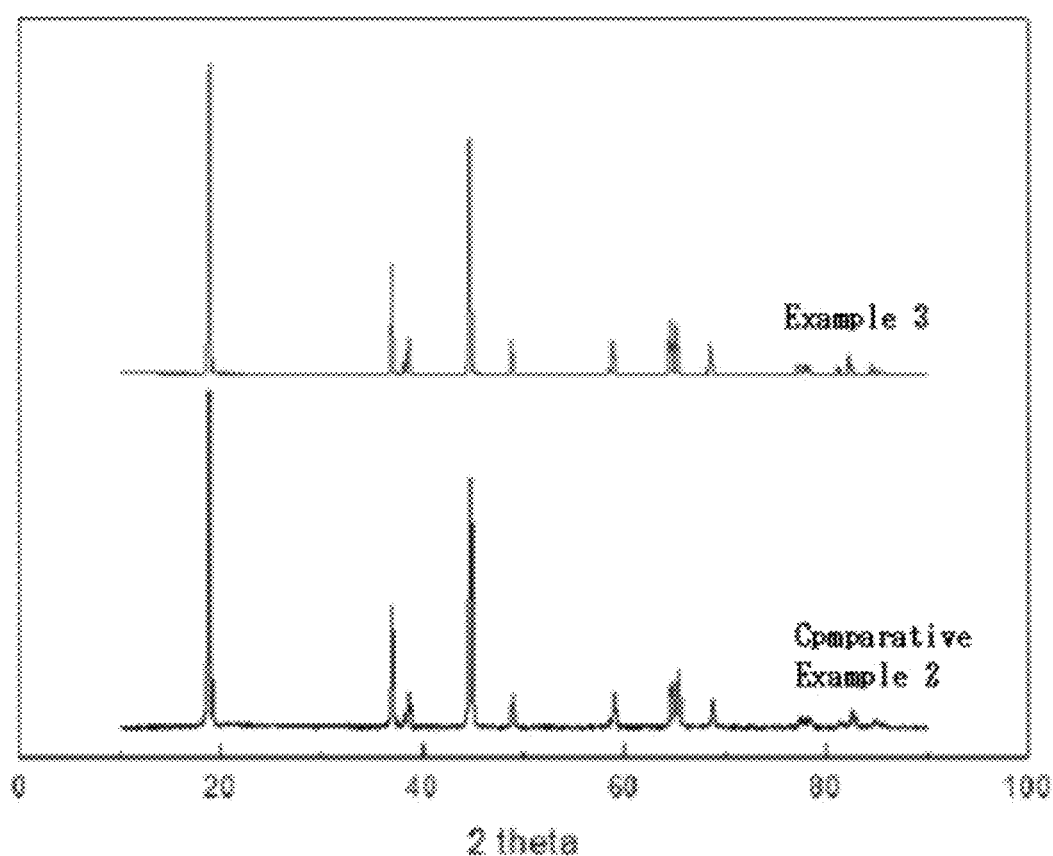

RECOVERY AND SYNTHESIS METHOD FOR METALOXIDIC CATHODIC ACTIVE MATERIAL FOR LITHIUM ION SECONDARY BATTERY

CROSS-REFERENCE TO RELATED APPLICATION

Pursuant to 35 U.S.C. §119(a), this application claims the benefit of earlier filing date and right of priority to Korean Application No. 10-2010-0092676, filed on Sep. 20, 2010, the contents of which is incorporated by reference herein in its entirety.

BACKGROUND OF THE INVENTION

1. Field of the Invention

The present invention relates to a recovery for a metaloxidic cathodic active material for a lithium ion battery and a synthesis method for a metaloxidic cathodic active material for the lithium ion battery by the recovery method.

2. Background of the Invention

Using ternary cathodic active material ($LiCo_{1/3}Ni_{1/3}Mn_{1/3}O_2$ or $LiNi_{0.5}Co_{0.2}Mn_{0.3}O_2$) and binary cathodic active material ($LiNi_{0.8}Co_{0.18}Al_{0.02}O_2$) for high capacity lithium ion secondary batteries for electric vehicles, which are regarded in recent time, is expected to be increased. Hence, the need to reprocess (recover) or recycle the ternary and binary cathodic active materials from the waste lithium secondary batteries for the electric vehicles, which are expected to be generated in the future, is coming into the fore.

Considering methods for recovering metaloxidic cathodic active materials for the lithium icon secondary batteries, which have been reported so far, those methods employ a process of separating the cathodic active material from the waste lithium ion secondary battery, extracting the cathodic active material using hydrochloric acid (HCl), and precipitating the extracted cathodic active material using cobalt hydroxide ($Co(OH)_3$) and nickel hydroxide ($Ni(OH)_2$) for collection, or a process of dissolving the cathodic active material using sulfuric acid ($H_2SO_4$) or nitric acid ($HNO_3$) under existence of hydrogen peroxide ($H_2O_2$), and separating and collecting cobalt and nickel using a neutralization-precipitation technology. Recently, a solvent extraction has also been used to extract cobalt and nickel from cathodic active material eluent.

Among other related art methods for dissolving the cathodic active material, a dissolving method using hydrochloric acid uses a strong acid upon an extraction process, which causes severe environmental pollution due to acid evaporated into the air, especially, causes serious problems, such as facility corrosion due to acid, and the like. Upon a dissolving process using sulfuric acid, since $Co^{3+}$ as a main cathodic active material is more instable than $Co^{2+}$ in a strong acid solution, merely using the sulfuric acid may result in an extremely low cobalt dissolution rate. To address such problem, more than 10% of hydrogen peroxide ($H_2O_2$), which is very expensive, should be input as a reductant to reduce $Co^{3+}$ of the cathodic active material into $Co^{2+}$ and more than 6M of concentrated sulfuric acid should be used to maintain a reaction temperature more than 70° C. In this case, economic efficiency may drastically be lowered due to excessive chemical costs and energy costs.

SUMMARY OF THE INVENTION

Therefore, an aspect of the present disclosure is to provide a recovery and synthesis for ternary and binary cathodic active materials for a lithium ion secondary battery, capable of expecting higher productivity and process simplification than the related art method, by performing a first step of injecting sulfurous acid gas ($SO_2$) as a reductant into 0.5~2M of sulfuric acid solution to be in a saturated state so as to dissolve the ternary or binary cathodic active material, a second step of synthesizing a precursor for electrode active material from main components of the dissolved solution without separation of cathode active material components like the related art, through a coprecipitation/synthesis process, and thereafter mixing the precursor with lithium compound, followed by heat treatment, to thus synthesize the cathodic active material, in the recovery of the ternary or binary cathodic active material for lithium ion secondary battery for electric vehicles, which are expected to be released on the market in the future.

To achieve these and other advantages and in accordance with the purpose of the present invention, as embodied and broadly described herein, there is provided a method for recovering metaloxidic cathodic active material for a lithium ion secondary battery including (a) dissolving a cathodic active material from a waste lithium ion secondary battery using sulfuric acid solution containing sulfurous acid gas to generate a solution containing metal ions, and (b) injecting sodium hydroxide solution and ammonia solution in the solution containing the metal ions to prepare an electrode active material precursor. The method may further include (c) filtrating the active material precursor, followed by drying and grinding, thus to fabricate a solid-state cathodic active material precursor.

Also, there is provided a method for synthesizing metaloxidic cathodic active material for a lithium ion secondary battery characterized by mixing the electrode active material precursor fabricated according to the above recovery method with lithium carbonate or lithium hydroxide, followed by heat treatment, to generate a metaloxidic cathodic active material.

In accordance with the present disclosure, in the dissolution process as the first step of dissolving the ternary or binary cathodic active material, the cathodic active material can be dissolved by injecting the sulfurous acid gas into the sulfuric acid solution, which allows the ternary or binary cathodic active material to be effectively dissolved at room temperature with low costs, and also allows the ternary or binary cathodic active material to be dissolved through a simplified process with much lower costs, as compared to the dissolution process using inorganic acid of the related art.

Also, upon dissolving the cathodic active material, since acidity of the solution used at the first step is not so high, an excessive amount of alkali may not need to be injected at the second step of fabricating the precursor as the process of synthesizing the precursor from the main components of the solution.

The precursor synthesis process is realized by a coprecipitation process. A sodium hydroxide solution whose moles correspond to twice of the total metal ion moles is injected into the fabricated solution, in which the ternary or binary metal ions are dissolved, so as to synthesize metal hydroxide through coprecipitation. For the same composition, spheronization and densification of the coprecipitated particles, an ammonia solution is added to adjust the coprecipitation rate with maintaining pH in the range of 8 to 14 and a temperature in the range of 30 to 70° C., thereby performing the precursor synthesis. Since the acidity of the solution used at the first step is not high, the synthesis can be performed by adjusting pH to a desired level without injecting an excessive amount of alkali, thereby allowing efficient economical processes. If the acidity is high, an excessive amount of alkali is needed. In this case, much sodium sulfate is generated to affect the coprecipitation reaction and excessively contained in the final product, thereby causing fatal disadvantages of being difficult to be washed and left as impurities. Therefore, the low acidity may derive an effect of improving purity of the final product.

Upon recovery of the ternary or binary cathodic active material for the lithium ion secondary battery, the electrode material can be synthesized directly from the solution without separation of components of the cathodic active material, which results in high productivity and process simplification as compared to the related art. Also, comparing the related art process of dissolving the cathodic active material by adding expensive hydrogen peroxide into hydrochloric acid or sulfuric acid or using ammonia water under high pressure, it is much more advantageous in view of the process costs. In addition, the dissolution is performed at a temperature higher than 70° C. in most of the related art methods, whereas the ternary or binary cathodic active material can be easily dissolved at room temperature in the present disclosure, thereby remarkably saving energy. Furthermore, unlike the related art methods acquiring a relatively low dissolution rate of about 85%, the dissolution of the cathodic active material according to the present disclosure can result in a dissolution rate more than 93%. Upon synthesizing the precursor from the solution, since acidity of the solution is not high, the precursor can be synthesized by adjusting pH to a desired level without injecting an excessive amount of alkali, resulting in realizing efficient and economical processes. Also, washing is facilitated and high purity can be ensured, accordingly, high purity of the final product can be exhibited.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is an X-ray diffraction pattern graph of cathodic active materials $LiNi_{0.5}Co_{0.2}Mn_{0.3}O_2$ fabricated according to Example 3 and Comparative Example 2.

DETAILED DESCRIPTION OF THE INVENTION

Figure 1:
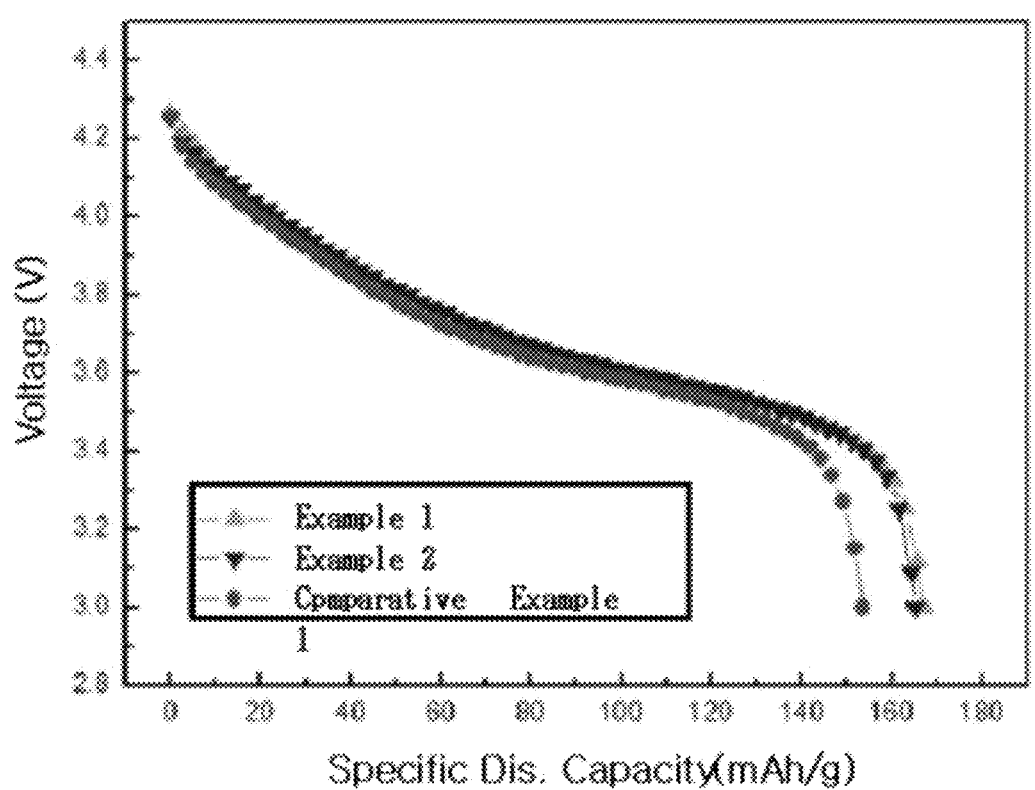
FIG. 1 is a discharge curve graph of cathodic active materials $LiCo_{1/3}Ni_{1/3}Mn_{1/3}O_2$ fabricated according to Examples 1 and 2 and Comparative Example 1.

This specification provides a method for recovering (reprocessing) metaloxidic cathodic active material for a lithium ion secondary battery, which may include (a) dissolving the cathodic active material from a waste lithium ion secondary battery using sulfuric acid solution containing sulfurous acid gas to generate a solution containing metal ions, (b) injecting (introducing) sodium hydroxide solution and ammonia solution in the solution containing the metal ions to prepare an electrode active material precursor, and (c) filtrating the active material precursor, followed by drying and grinding, thus to fabricate a solid-state cathodic active material precursor.

The concentration of the sulfuric acid solution may be in the range of 0.5 to 2M, the sulfurous acid gas contained in the sulfuric acid solution may be contained in a saturated state, and the concentration of the cathodic active material within the solution containing the metal ions may be in the range of 10 to 50 g/L.

At step (b), the concentration of the metal ion within the solution containing the metal ions may be in the range of 1 to 6M. The sodium hydroxide solution may be injected in the concentration twice as high as the metal ion concentration of the solution containing the metal ions. The concentration of the ammonia solution may be in the range of 6 to 13M.

Meanwhile, a synthesis method for metaloxidic cathodic active material for lithium ion secondary battery may be configured to mix the electrode active material precursor obtained by the above-mentioned method with lithium carbonate or lithium hydroxide and performing a heat treatment for the mixture to generate metaloxidic cathodic active material. A molar ratio between the cathodic oxide precursor and the lithium carbonate or lithium hydroxide may be 1:1.0 to 1:1.3, and the heat treatment may be carried out at a temperature of 600 to 1000° C. under air or oxygen atmosphere.

Also, this specification provides a synthesis method for cathodic active material, in the case of recovering the ternary or binary cathodic active material for the lithium ion secondary battery, the synthesis method including dissolving the cathodic active material by injecting sulfurous acid gas into sulfuric acid solution, synthesizing main components of the dissolved solution into cathodic active material precursor through a coprecipitation process of introducing alkali, and mixing the precursor with lithium compound, followed by heat treatment, thus to synthesize the cathodic active material. In the dissolution of the cathodic active material, this inventors have repeated a test for maximizing the dissolution rate of the cathodic active material in the state of lowering the sulfuric acid concentration as low as possible, and accordingly exhibited the fact that the dissolution rate of the cathodic active material remarkably increases when introducing the sulfurous acid gas into the sulfuric acid solution. Therefore, the inventors have utilized such characteristic.

Explaining each step in more detail, at the step of preparing the solution containing the metal ions by dissolving the cathodic active material, a sulfuric acid solution in the concentration of 0.5 to 2M is poured into a reactor. Sulfurous acid gas is then introduced into the reactor with stirring the solution such that the sulfurous acid gas can be saturated. If the concentration range of the sulfuric acid is low, the dissolution rate of the cathodic active material may disadvantageously be lowered. On the other hand, if the concentration range of the sulfuric acid is high, too much sulfuric acid may unnecessarily be added. It has been known that the dissolution rate of the sulfurous acid gas to the sulfuric acid solution is approximately 1M. However, the present disclosure may not limit the introduction amount or concentration of the sulfurous acid gas to a specific range. Instead, the sulfurous acid gas may be introduced to be sufficiently saturated in the sulfuric acid solution prior to dissolving the cathodic active material.

Then, after being completely ready for the reaction, a raw material obtained by grinding ternary or binary cathodic active material for lithium ion secondary battery is added into the reactor in the range of 10 to 50 gr per 1 L of the dissolved solution, with continuously stirring the solution contained in the reactor, and then dissolved in the solution. If the added amount of the cathodic active material for the lithium ion secondary battery is lower than the range, productivity may be lowered. Furthermore, if higher than the range, the dissolution rate may be lowered. Hence, the dissolution reaction of the cathodic active material is carried out at room temperature, and a reaction time of 1 hour is enough.

This detailed description may not limit the reaction temperature to a specific condition in the dissolution conditions of the ternary or binary cathodic active material. Also, an extraction time may not be limited to any specific time. However, it was noticed that about 1 hour is experimentally enough for the dissolution. Upon completion of the dissolution process, non-reacted residue is filtered out, thereby collecting the cathodic active material solution.

Afterwards, in a state that the total metal ion concentration of the solution, in which the ternary or binary metal ions are dissolved, is in the range of 1 to 6M and the concentration of the sodium hydroxide solution is in the range of 2 to 12M, which corresponds to about two times higher than the metal ion concentration, the metal ion-dissolved solution and the sodium hydroxide solution are injected at the same flow rate, thereby synthesizing metal hydroxide through a coprecipitation process. Here, for the same composition, spheronization and densification of the coprecipitated particles, an ammonia solution in the concentration of 6 to 13M is added to adjust the coprecipitation rate with maintaining pH in the range of 8 to 14 and a temperature in the range of 30 to 70° C., thereby performing the synthesis. Shape, size, distribution and density of the coprecipitated particles can be controlled by adjusting the flow rate, pH and temperature. The synthesized precursor is washed and filtrated about 10 times to filter out impurities, followed by drying and grinding. The thusly-obtained precursor is used as metal hydroxide precursor.

For synthesis of the cathodic active material, the metal hydroxide precursor and lithium carbonate or lithium hydroxide whose molar ratio is 1:1.0-1.3 are uniformly mixed using a blender mixer. The mixture is thermally treated for 3 to 24 hours at 600 to 1000° C. under air or oxygen atmosphere, thereby synthesizing a ternary or binary lithium ion metaloxidic cathodic active material. As a raw material for the ternary or binary cathodic active material for the lithium ion secondary battery, the waste cathodic active material, which is generated during fabrication of the lithium ion secondary battery or the ternary or binary cathodic active material, which is separated from a discarded waste lithium ion secondary battery after being used, can be used. The present disclosure may not have any limitation on those methods of detaching (separating), gathering or grinding the cathodic active material from the lithium ion secondary battery.

EXAMPLES

Hereinafter, description will be given in detail of several examples. However, those examples are merely illustrative and should not be construed to limit the present disclosure.

Example 1

10 gr of a raw material, which was prepared by gathering lithium ion secondary battery ternary cathodic active material $(LiCo_{1/3}Ni_{1/3}Mm_{1/3}O_2)$ and grinding the same into powders, was poured into a reactor together with 1000 ml of 0.5M sulfuric acid solution, in which sulfurous acid gas is injected to be saturated. Under this state, the solution was dissolved for an hour with being stirred at room temperature.

Non-reacted residue was filtered out and the solution was collected. A dissolution rate of the ternary cathodic active material for the lithium ion secondary battery was 93.3% based upon an initial weight of the raw material.

In the state that the concentration of the metal ion in the solution was 2M and the concentration of the sodium hydroxide was 4M corresponding to twice of the concentration of the metal ion, the two materials were injected into 2 L-capacity continuous reactor at a velocity of 5 ml/min, respectively, and 13M of ammonia water was injected into the continuous reactor to adjust pH to 11.0. Here, the temperature was maintained at 50° C.

The synthesized precursor was washed and filtrated for 10 times to remove impurities, and dried in a dryer for 24 hours at 80~100° C., thereby fabricating hydroxide precursor. After grinding the hydroxide precursor, the grinded hydroxide precursor and the lithium carbonate powders were mixed in the molar ratio of 1:1.2 in a blender mixer to thereafter be sintered for 12 hours at 950° C. within a heat treatment furnace in the air atmosphere, thereby synthesizing the final product, namely, cathodic active material $(LiCo_{1/3}Ni_{1/3}Mn_{1/3}O_2)$.

For performance evaluation, the cathodic active material $(LiCo_{1/3}Ni_{1/3}Mn_{1/3}O_2)$ as the final product, a conductive material and PVdF binder were mixed in a weight ratio of 94:4:2 using NMP organic solvent, and casted on an aluminum thin plate through a doctor blade process to be dried and rolled, thereby fabricating a cathode. The fabricated cathode and common graphite electrode were used to fabricate a pouch type lithium ion secondary battery, and the battery characteristic thereof was examined.

Example 2

50 gr of powders of the lithium ion secondary battery ternary cathodic active material $(LiCo_{1/3}Ni_{1/3}Mn_{1/3}O_2)$, which was the same as those used in Example 1, were poured into the same reactor as that in Example 1 together with 1000 ml of 2M sulfuric acid solution, in which the sulfurous acid gas was injected to be saturated. Under this state, the solution was dissolved for an hour with being stirred at room temperature according to the same method as in Example 1.

Similar to Example 1, a non-reacted residue was filtered out and the solution was collected. A dissolution rate of the ternary cathodic active material for the lithium ion secondary battery was 95.6% based upon an initial weight of the raw material.

The succeeding processes of fabricating the hydroxide precursor, synthesizing the cathodic active material $(LiCo_{1/3}Ni_{1/3}Mn_{1/3}O_2)$ as the final product, fabricating the cathode and the lithium ion secondary battery using the cathodic active material, and examining the battery characteristic thereof, were the same as those in Example 1.

Example 3

Unlike Examples 1 and 2, 10 gr of a raw material, which was prepared by gathering a ternary cathodic active material $(LiNi_{0.5}Co_{0.2}Mn_{0.3}O_2)$ and grinding the same into powders, was poured into a reactor together with 1000 ml of 0.5M sulfuric acid solution, in which the sulfurous acid gas was injected to be saturated. Under this state, the solution was dissolved for an hour with being stirred at room temperature according to the same method as in Example 1.

Similar to Example 1, a non-reacted residue was filtered out and the solution was collected. A dissolution rate of the ternary cathodic active material for the lithium ion secondary battery was 93.3% based upon an initial weight of the raw material.

The succeeding processes of preparing the hydroxide precursor, synthesizing the cathodic active material (LiNi$_{0.5}$Co$_{0.2}$Mn$_{0.3}$O$_2$) as the final product, fabricating the cathode and the lithium ion secondary battery using the cathodic active material, and examining the battery characteristic thereof, were the same as those in Example 1.

Example 4

10 gr of a raw material, which was prepared by gathering a binary cathodic active material (LiNi$_{0.8}$Co$_{0.18}$Al$_{0.02}$O$_2$) and grinding the same into powders, was poured into a reactor together with 1000 ml of 0.5M sulfuric acid solution, in which the sulfurous acid gas was injected to be saturated. Under this state, the solution was dissolved for an hour with being stirred at room temperature according to the same method as in Example 1.

Similar to Example 1, a non-reacted residue was filtered out and the solution was collected. A dissolution rate of the ternary cathodic active material for the lithium ion secondary battery was 93.3% based upon an initial weight of the raw material.

The succeeding processes of preparing the hydroxide precursor, synthesizing the cathodic active material (LiNi$_{0.8}$Co$_{0.18}$Al$_{0.02}$O$_2$) as the final product, fabricating the cathode and the lithium ion secondary battery using the cathodic active material, and examining the battery characteristic thereof, were the same as those in Example 1.

Comparative Example 1

10 gr of a raw material, which was prepared by gathering the ternary cathodic active material (LiCo$_{1/3}$Ni$_{1/3}$Mn$_{1/3}$O$_2$) of Example 1 and grinding the same into powders, was poured into a reactor together with 1000 ml of 6M sulfuric acid solution. The saturation of sulfurous acid gas was not executed. Here, 100 ml of hydrogen peroxide in the concentration of 35% was added as a reductant into the solution, thereby obtaining 1000 ml of the sulfuric acid solution. In this state, the solution was dissolved for an hour with being stirred at 70° C.

Similar to Example 1, a non-reacted residue was filtered out and the solution was collected. A dissolution rate of the ternary cathodic active material for the lithium ion secondary battery was 84.5% based upon an initial weight of the raw material.

The succeeding processes of preparing the hydroxide precursor, synthesizing the cathodic active material (LiCo$_{1/3}$Ni$_{1/3}$Mn$_{1/3}$O$_2$) as the final product, fabricating the cathode and the lithium ion secondary battery using the cathodic active material, and examining the battery characteristic thereof, were the same as those in Example 1.

Comparative Example 2

10 gr of a raw material, which was prepared by gathering the ternary cathodic active material (LiNi$_{0.5}$Co$_{0.2}$Mn$_{0.3}$O$_2$) of Example 3 and grinding the same into powders, was poured into a reactor together with 1000 ml of 6M sulfuric acid solution. The saturation of sulfurous acid gas was not executed. Here, 100 ml of hydrogen peroxide in the concentration of 35% was added as a reductant into the solution, thereby obtaining 1000 ml of the sulfuric acid solution. In this state, the solution was dissolved for an hour with being stirred at 70° C.

Similar to Example 1, a non-reacted residue was filtered out and the solution was collected. A dissolution rate of the ternary cathodic active material for the lithium ion secondary battery was 86.1% based upon an initial weight of the raw material.

The succeeding processes of preparing the hydroxide precursor, synthesizing the cathodic active material (LiNi$_{0.5}$Co$_{0.2}$Mn$_{0.3}$O$_2$) as the final product, fabricating the cathode and the lithium ion secondary battery using the cathodic active material, and examining the battery characteristic thereof, were the same as those in Example 1.

FIG. 1 is a graph showing discharge characteristics of lithium ion secondary batteries using the cathodic active materials fabricated according to Examples 1 and 2 and Comparative Example 1. As shown in FIG. 1, the cathodic active materials of Examples 1 and 2 exhibited high discharge capacity and high discharge voltage, whereas the cathodic active material of Comparative Example 1 exhibited low discharge capacity and low discharge voltage. Such results can be explained as follows. In Comparative Example 1, the use of strong sulfuric acid lowers the dissolution rate of the raw material powders. Especially, the sodium hydroxide is excessively added during the coprecipitation process, and accordingly, some sodium sulfate as impurities is mixed, which causes purity of the precursor to be lowered and granularity thereof to be non-uniform, resulting in synthesizing a cathodic active material with a lower performance. Consequently, the lithium ion secondary battery using the material exhibits low discharge characteristics.

Figure 2:
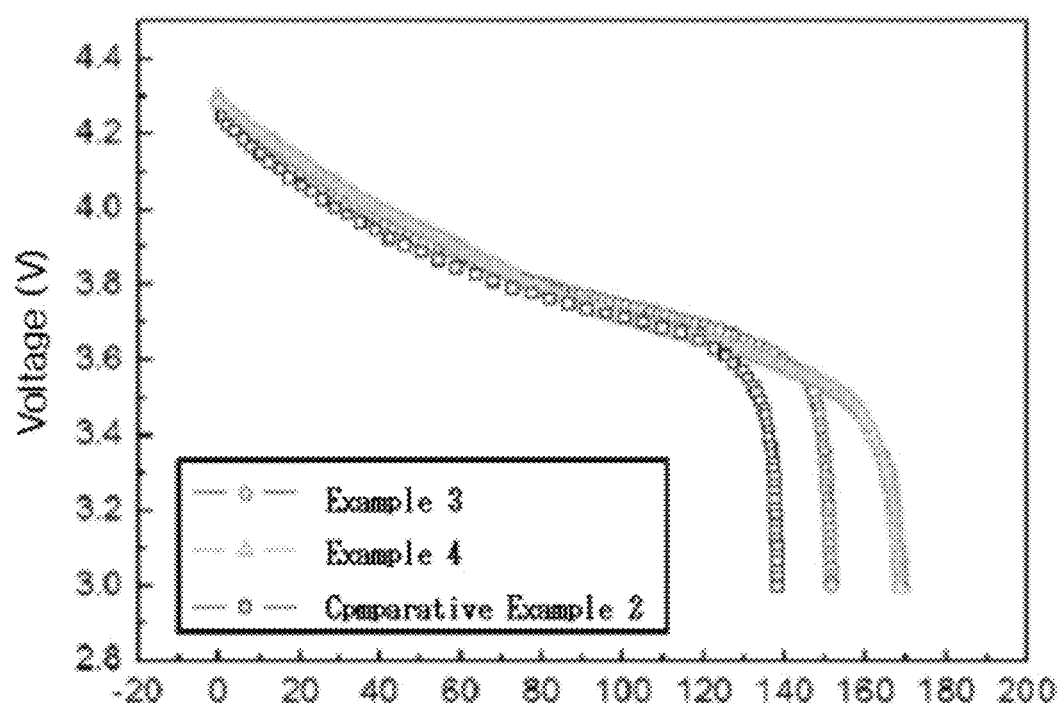
FIG. 2 is a discharge curve graph of cathodic active materials $LiNi_{0.5}Co_{0.2}Mn_{0.3}O_2$ fabricated according to Example 3 and Comparative Example 2, and cathodic active material $LiNi_{0.8}Co_{0.18}Al_{0.02}O_2$ fabricated according to Example 4.

FIG. 2 is a graph showing discharge characteristics of lithium ion secondary batteries using the cathodic active materials fabricated according to Examples 3 and 4 and Comparative Example 2. As shown in FIG. 2, the cathodic active material of Examples 3 and 4 exhibited high discharge capacity and discharge voltage, whereas the cathodic active material of Comparative Example 2 exhibited low discharge capacity and low discharge voltage. Such results can be explained as follows. In Comparative Example 2, the use of strong sulfuric acid lowers the dissolution rate of the raw material powders. Especially, the sodium hydroxide is excessively added during the coprecipitation process, and accordingly, some sodium sulfate as impurities is mixed, which causes purity of the precursor to be lowered and granularity thereof to be non-uniform, resulting in synthesizing a cathodic active material with a lower performance. Consequently, the lithium ion secondary battery using the material exhibits low discharge characteristics.

FIG. 3 is a graph showing an X-ray diffraction pattern of the cathodic active materials (LiNi$_{0.5}$Co$_{0.2}$Mn$_{0.3}$O$_2$) fabricated according to Example 3 and Comparative Example 2. As shown in FIG. 3, it can be noticed the cathodic active materials fabricated according to Example 3 and Comparative Example 2 have a structure with R-3 m space group. Hence, the difference of the discharge capacities between Example 3 and Comparative Example 2 is not resulted from the difference of a crystal structure of LiNi$_{0.5}$Co$_{0.2}$Mn$_{0.3}$O$_2$. As aforesaid, it may be strongly possible that the difference is caused due to the difference of the impurities and granularities.

As described above, upon recovering the ternary or binary cathodic active material for the lithium ion secondary battery according to the method, the electrode material can be synthesized directly from the dissolved solution without separation of components of the cathodic active material, which may be advantageous for achieving high productivity and process simplification as compared with the related art method. Also, fabrication cost can be remarkably lowered as compared with the related art fabrication cost, and a remarkable energy saving can be realized by virtue of the room temperature process. In addition, the use of weak sulfuric acid having a relatively low concentration of 0.5~2M can reduce environmental pollution, alkali consumption can be greatly reduced, and more than 95% of dissolution rate can be acquired.

Above all, according to the method of this specification, the precursor for the electrode active material can be synthesized directly from the dissolved solution without separation of components of the cathodic active material like the related art method, thereby realizing higher productivity and process simplification than the related art method, resulting in synthesis of ternary and binary cathodic active materials having high purities with low costs.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for recovering metaloxidic cathodic active material for a lithium ion secondary battery comprising:
   (a) dissolving a ternary or binary cathodic active material from a waste lithium ion secondary battery using sulfuric acid solution containing sulfurous acid gas to generate a solution containing metal ions; and
   (b) injecting sodium hydroxide solution and ammonia solution in the solution containing the metal ions to fabricate an electrode active material precursor;
   wherein the concentration of the ternary or binary cathodic active material within the solution containing the metal ions is in the range of 10 to 50 g/L;
   wherein the concentration of the sulfuric acid solution is in the range of 0.5 to 2M, and the sulfurous acid gas contained in the sulfuric acid solution is in a saturated state;
   wherein step (a) is performed at room temperature within 1 hour;
   wherein in step (b), the ammonia solution in the range of 6 to 13 M is added to adjust the coprecipitation rate with maintaining pH in the range of 8 to 14 and a temperature in the range of 30 to 70° C.; and
   wherein in step (b), the concentration of metal ions in the solution containing the metal ions is in the range of 1 to 6M, and the sodium hydroxide solution is injected at a concentration twice as high as the metal ion concentration of the solution containing the metal ions.

2. The method of claim 1, further comprising (c) filtrating the active material precursor, followed by drying and grinding, thus to fabricate a solid-state cathodic active material precursor.

3. A method for preparing an electrode active material precursor of ternary or binary cathodic active material, consisting of:
   (a) dissolving a ternary or binary cathodic active material from a waste lithium ion secondary battery using sulfuric acid solution containing sulfurous acid gas to generate a solution containing metal ions; and
   (b) injecting sodium hydroxide solution and ammonia solution in the solution containing the metal ions to fabricate the electrode active material precursor,
   wherein the concentration of the ternary or binary cathodic active material within the solution containing the metal ions is in the range of 10 to 50 g/L;
   wherein the concentration of the sulfuric acid solution is in the range of 0.5 to 2 M and the sulfurous acid gas contained in the sulfuric acid solution of step (a) is in a saturated state;
   wherein the step (a) is performed at room temperature within 1 hour;
   wherein the ammonia solution in the range of 6 to 13 M is added to adjust the coprecipitation rate with maintaining pH in the range of 8 to 14 and a temperature in the range of 30 to 70° C.; and
   wherein in step (b), the concentration of metal ions in the solution containing the metal ions is in the range of 1 to 6 M, and the sodium hydroxide solution is injected at a concentration twice as high as the metal ion concentration of the solution containing the metal ions.

* * * * *